Oct. 29, 1968     C. F. JORDAN     3,407,607
LYSIMETER WITH MEANS FOR BREAKING SURFACE TENSION
Filed June 27, 1966     2 Sheets-Sheet 1
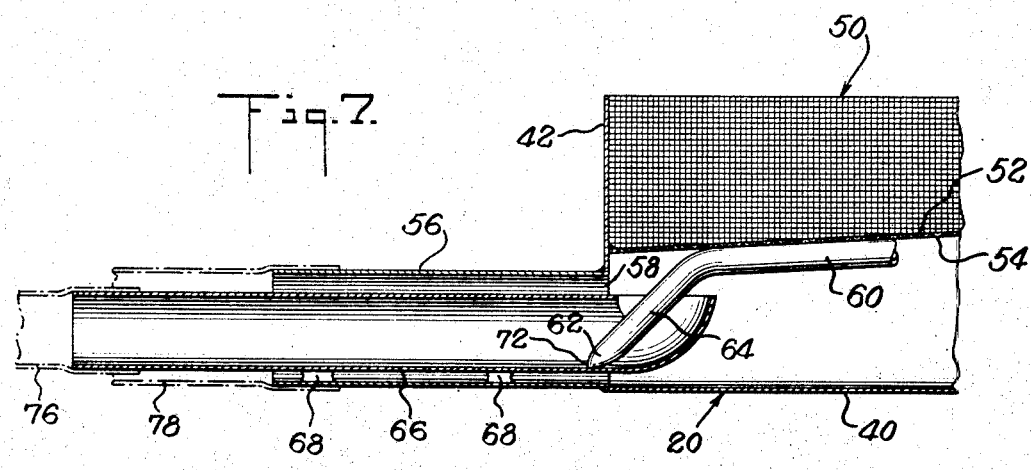
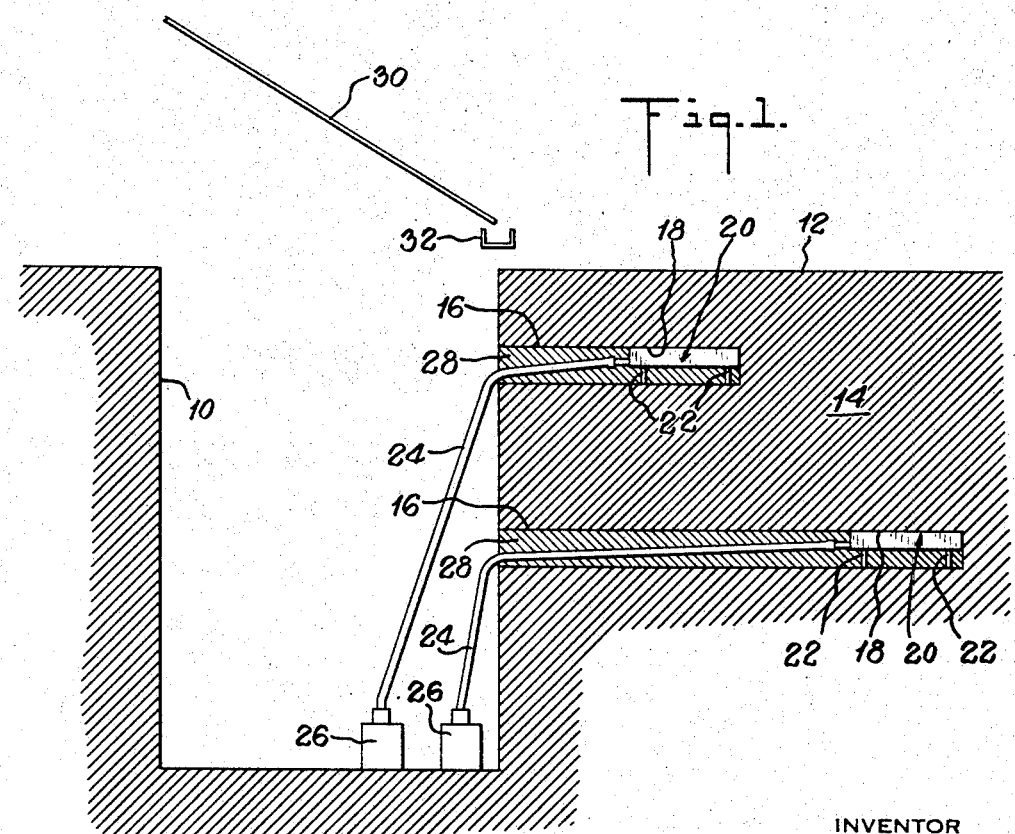
INVENTOR
CARL F. JORDAN
BY
Samuelson & Jacob
ATTORNEYS

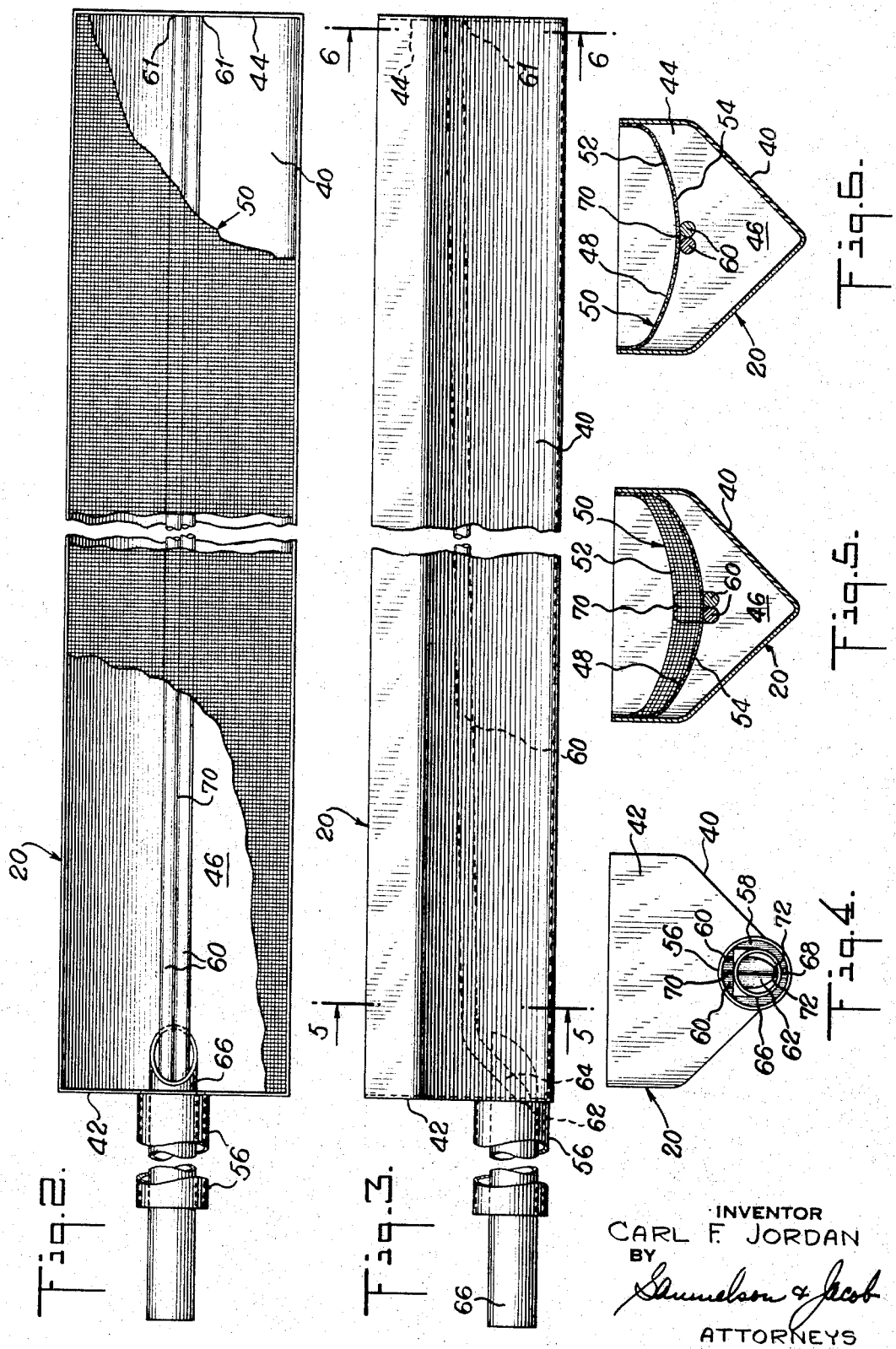

United States Patent Office 3,407,607
Patented Oct. 29, 1968

3,407,607
LYSIMETER WITH MEANS FOR BREAKING
SURFACE TENSION
Carl F. Jordan, 118 Leabrook Lane,
Princeton, N.J. 08540
Filed June 27, 1966, Ser. No. 560,721
9 Claims. (Cl. 61—11)

ABSTRACT OF THE DISCLOSURE

A lysimeter for measuring the percolation of water through soil, the lysimeter having a screen which supports the soil upon the upper surface of the screen above a trough chamber and a bar contacting the screen along a portion of the lower surface of the screen for breaking the surface tension ordinarily established along the lower surface of the screen and allowing water to flow from the soil along the bar into the chamber.

---

The present invention relates generally to apparatus for collecting water moving through undisturbed soil and pertains, more specifically, to an improved lysimeter construction for use as a reseach instrument in studies of the quantity and quality of soil water.

Lysimeters have long been employed for measuring the percolation of water through soils and determining the soluble constituents removed in the drainage. The commonly used "Ebermayer" or drip-pan lysimeters employ a generally horizontal trough placed against the ceiling of a horizontal tunnel in the soil such that water pressing down through the soil above the trough will drip into the trough and will thus be collected for further study. It has been found that with such apparatus, some surface tension exists at the soil-air interface where the water would normally leave the soil and enter the trough, and the ability of the trough to collect water is thus impaired.

It is therefore an object of the invention to provide a lysimeter construction which allows water to flow more freely from the soil, in which the lysimeter is installed, into the lysimeter thereby rendering the apparatus capable of operating under conditions where ordinary lysimeters would not yield water.

Another object of the invention is to provide an improved lysimeter construction wherein the surface tension at the soil-air interface between the lysimeter and the soil in which the lysimeter is installed is released or broken so that the flow of water from the soil into the trough of the lysimeter is accomplished more freely.

A further object of the invention is to provide a lysimeter wherein the soil water may be delivered to a collection point independent of condensed water vapor within the lysimeter system so that dilution of the soil water by condensed water vapor may be prevented.

A still further object of the invention is to provide an improved lysimeter having a relatively simple construction which is easily fabricated and which can be employed in soil studies without a drastic departure from known study techniques.

The above objects are accomplished in the apparatus of the invention which may be described briefly as apparatus for collecting water moving through soil, the apparatus comprising means providing a chamber below the soil through which the water moves, the chamber having an opening therein, porous means supported by the chamber-providing means over the opening for separating the soil from the chamber with the soil resting against the porous means and outside the chamber, and at least one bar contacting the porous means within the chamber opposite the soil for breaking the surface tension ordinarily established along the porous means and allowing water to flow from the soil along the bar into the chamber.

The invention will be more fully understood and further objects and advantages of the invention will become apparent in the following detailed description of an embodiment of the invention illustrated in the accompanying drawing, in which:

FIGURE 1 is a diagrammatic view illustrating a lysimeter installation;

FIGURE 2 is a plan view of a lysimeter constructed in accordance with the invention;

FIGURE 3 is a side elevational view of the lysimeter of FIGURE 2;

FIGURE 4 is an end elevational view looking at the left end of the lysimeter;

FIGURE 5 is a cross-sectional view taken along line 5—5 of FIGURE 3;

FIGURE 6 is a cross-sectional view taken along line 6—6 of FIGURE 3; and

FIGURE 7 is an enlarged fragmentary longitudinal cross-sectional view illustrating details of the water-collection construction.

Referring now to the drawing, and especially to FIGURE 1, a lysimeter installation is shown diagrammatically at a site where percolating water is to be collected. The installation includes a pit 10 which is dug below the surface 12 of the soil 14 through which water is moving downwardly. Horizontal tunnels 16 are bored into the soil 14, each tunnel 16 having a ceiling 18. A lysimeter 20 is placed in each tunnel and is wedged tightly against a ceiling 18 by supports 22. A collection tube 24 connects each lysimeter with a collection bottle 26 placed at the bottom of the pit. After the lysimeters are placed within their respective tunnels, the tunnels are packed with soil 28, which was originally removed to establish tunnels 16, and the lysimeters are left to collect water passing downwardly through soil 14. A roof 30 protects pit 10 from water falling upon surface 12 and a gutter 32 carries away any water falling upon roof 30.

Turning now to FIGURES 2 through 7, a lysimeter 20 is shown in detail and is seen to have a trough 40 having opposite end walls 42 and 44 providing a chamber 46 with an opening at the open top 48 (see FIGURES 5 and 6). Trough 40 is prefreably constructed of a material which will not contaminate the water being collected by the lysimeter. Such materials as rigid plastics or stainless steel have been found to be satisfactory. In a lysimeter of convenient size, trough 40 could have a length of about twelve inches and a width of about two inches, though other dimensions are possible.

Porous means in the form of a screen 50 is placed over the opening to chamber 46 of the trough, as shown, and fixed in place by being secured to the trough walls. Screen 50 has an outside face 52 (see FIGURES 5 and 6) for contacting the soil 14 and an opposite inside face 54 facing the interior of chamber 46. The screen 50 thus serves to separate the soil from the interior of the chamber 46, the soil 14 resting upon the outside face 52 of the screen. The screen too is preferably fabricated of a material which is rust resistant and which will not contaminate the collected water. One such material is glass fiber which can be fixed to the trough with an epoxy cement.

In the above described installation, the soil 14 lies against screen 50 so that water moving downwardly through the soil would tend to pass through the screen and into the trough. Such water could then be collected through a trough outlet fitting 56 (see FIGURE 7) which communicates with an opening 58 in end wall 42 of the trough. However, it has been found that surface tension at the soil-air interface established along the screen 50 will impair the flow of water from the soil into the trough and under conditions where the water volume is relatively low the impairment can preclude any significant flow of water into the trough.

In order to render lysimeter 20 capable of yielding sufficient water even under low volume conditions, a pair of bars 60 is placed below the screen 50, each bar extending along almost the entire length of the screen, and the trough, the bars being fixed at one end 61 to end wall 44 of the trough and resting at the other end 62 as will be explained below. As best seen in FIGURES 3, 5 and 6, both the screen and the bars slope downwardly from the right end wall 44 of the trough toward the left end wall 42 and the screen and bars are in contact with one another along the greatest portion of the length of the bars and along almost the entire length of the screen. The contact between the bars and the inside face 54 of the screen serves to break the surface tension which might otherwise preclude passage of water through the screen and into the chamber and water will flow along the bars 60 in the direction of the downward slope. Thus, the bars 60 provide a path along which soil water can flow smoothly, without dripping, toward downwardly directed legs 64 of the bars. These legs 64 terminate inside a second outlet fitting 66 (see FIGURE 7) with ends 62 resting thereon. The second outlet fitting 66 is coaxial with the trough outlet fitting 56 and is supported therein by struts 68 (see FIGURE 4). Although only one bar 60 is necessary for satisfactory performance, it has been found that the provision of at least two bars 60, placed contiguous with one another, will establish a small channel 70 (see FIGURES 5 and 6) therebetween, by virtue of the circular cross-sectional configuration of each bar 60, and the small channel 70 between the bars will enhance the smooth conduct of water from the screen, along the bars and along the downwardly directed legs 64 into the second outlet fitting 66. Legs 64 are tapered to a point 72 at the ends 62 thereof to further facilitate the smooth flow of water established by bars 60. By allowing the points 72 of the bars 60 to touch the fitting 66, the continuity of the smooth flow of water from the soil to the fitting is unbroken.

Bars 60 are preferably fabricated of stainless steel and, in a lysimeter having the dimensions set forth above, the bars may have a diameter of about ⅛ inch. An effective downward slope for the bars, and the screen, has been found to be about 5° to the horizontal direction.

The arrangement of the trough outlet fitting 56 and the second outlet fitting 66 allows separate collection of water from the trough 40 and from the bars 60. Thus, water passing through soil 14 and through screen 50 to be carried along bars 60 to fitting 66 may be collected by an inner collector tube 76 (see FIGURE 7) which may be connected to the fitting 66 while an outer collector tube 78 may be connected to fitting 56 and thus will be in communication with the chamber 46 of the trough to collect water vapor or condensate within the chamber. Together, inner and outer tubes 76 and 78 make up the collection tube 24.

The outer tube 78 can thus serve as a condensate collector which provides a surface upon which water vapor from the warmer, moist soil air can condense on cool summer nights and in the winter. Since the inner tube 76 carries soil water directly from bars 60, dilution of the soil water by condensed water vapor in the trough may be prevented. Bars 60 will allow soil water to flow from soil 14 into the collector tube 76 without ever requiring the formation of a droplet which must drop to the bottom of the trough and run out of the trough to be collected.

It will be apparent that the improved lysimeter described above will, by virtue of the employment of at least one surface tension release bar 60, permit the collection of water from soil under conditions where ordinary lysimeters will yield little or no water. The bars 60 permit a smooth flow of water along an unbroken path from the capillary pores in the soil to the inner collector tube and into the collection bottle. The improved lysimeter construction thus provides a more versatile apparatus for quantitative or qualitative studies of soil water.

It is to be understood that the above detailed description of an embodiment of the invention is provided by way of example only. Various details of design and construction may be modified without departing from the true spirit and scope of the invention as set forth in the appended claims.

What is claimed is:

1. Apparatus for collecting water moving through soil, said apparatus comprising:
   means providing a chamber below the soil through which the water moves, said chamber having an opening therein;
   porous means secured to said chamber-providing means and extending over said opening for separating the soil from the interior of the chamber, said porous means having an outside face facing the soil and an opposite inside face facing the interior of the chamber with the soil resting against the outside face of the porous means and outside the chamber; and
   at least one bar lying below the porous means and contacting a portion of the inside face of the porous means and extending along said portion of the inside face within the chamber opposite the soil for breaking the surface tension ordinarily established along the porous means and allowing water to flow from the soil along the bar into the chamber.

2. Apparatus of claim 1 wherein:
   said chamber-providing means extends essentially horizontally;
   said porous means extends at a slight incline to the horizontal; and
   said bar extends at essentially the same inclination as the porous means to contact the porous means along the greatest portion of the length of the bar.

3. Apparatus of claim 2 including at least two bars contiguous with one another, the bars presenting a cross-sectional configuration which provides a channel for carrying water from the porous means.

4. Apparatus for collecting water moving through soil, said apparatus comprising:
   means providing a chamber below the soil through which the water moves, said chamber having an opening therein, said chamber-providing means including an elongated trough extending between opposite ends and having an open top providing said opening;
   porous means supported by said chamber-providing means over said opening for separating the soil from the chamber with the soil resting against the porous means and outside the chamber, said porous means including a screen fixed to the trough and lying over the open top, said screen having an outside face against which the soil rests and an opposite inside face facing the interior of the chamber; and
   at least one bar contacting the porous means within the chamber opposite the soil for breaking the surface tension ordinarily established along the porous means and allowing water to flow from the soil along the bar into the chamber, said bar having a length extending in a direction from end to end of the trough and contacting the inside face of the screen along the greatest portion of said length.

5. Apparatus of claim 4, wherein:
   said trough extends essentially horizontally;
   said screen extends between said opposite ends at a slight incline to the horizontal; and
   said bar extends at essentially the same inclination as the screen to contact the screen along the greatest portion of said length.

6. Apparatus of claim 5 including at least two bars contiguous with one another, the bars presenting a cross-sectional configuration which provides a channel for carrying water from the screen.

7. The apparatus of claim 5 including a fitting extending through an end of the trough and wherein said bar follows a path which departs from the screen adjacent one end of the bar, said one end of the bar terminating in said fitting such that water from said soil which passes through said screen and along said bar is delivered to said fitting.

8. The apparatus of claim 7 including another fitting communicating with the chamber independent of the first said fitting.

9. The apparatus of claim 8 wherein said fittings are coaxial.

References Cited

UNITED STATES PATENTS

| | | | |
|---|---|---|---|
| 173,208 | 2/1876 | Byram | 61—10 |
| 599,719 | 3/1898 | Manning | 61—10 |
| 801,995 | 10/1905 | Kisner | 166—230 |
| 1,129,554 | 2/1915 | Courtney | 61—13 |
| 2,083,389 | 6/1937 | Moore | 166—230 X |

EARL J. WITMER, *Primary Examiner.*